(No Model.)
J. CLARK.
VELOCIPEDE.
No. 516,786. Patented Mar. 20, 1894.
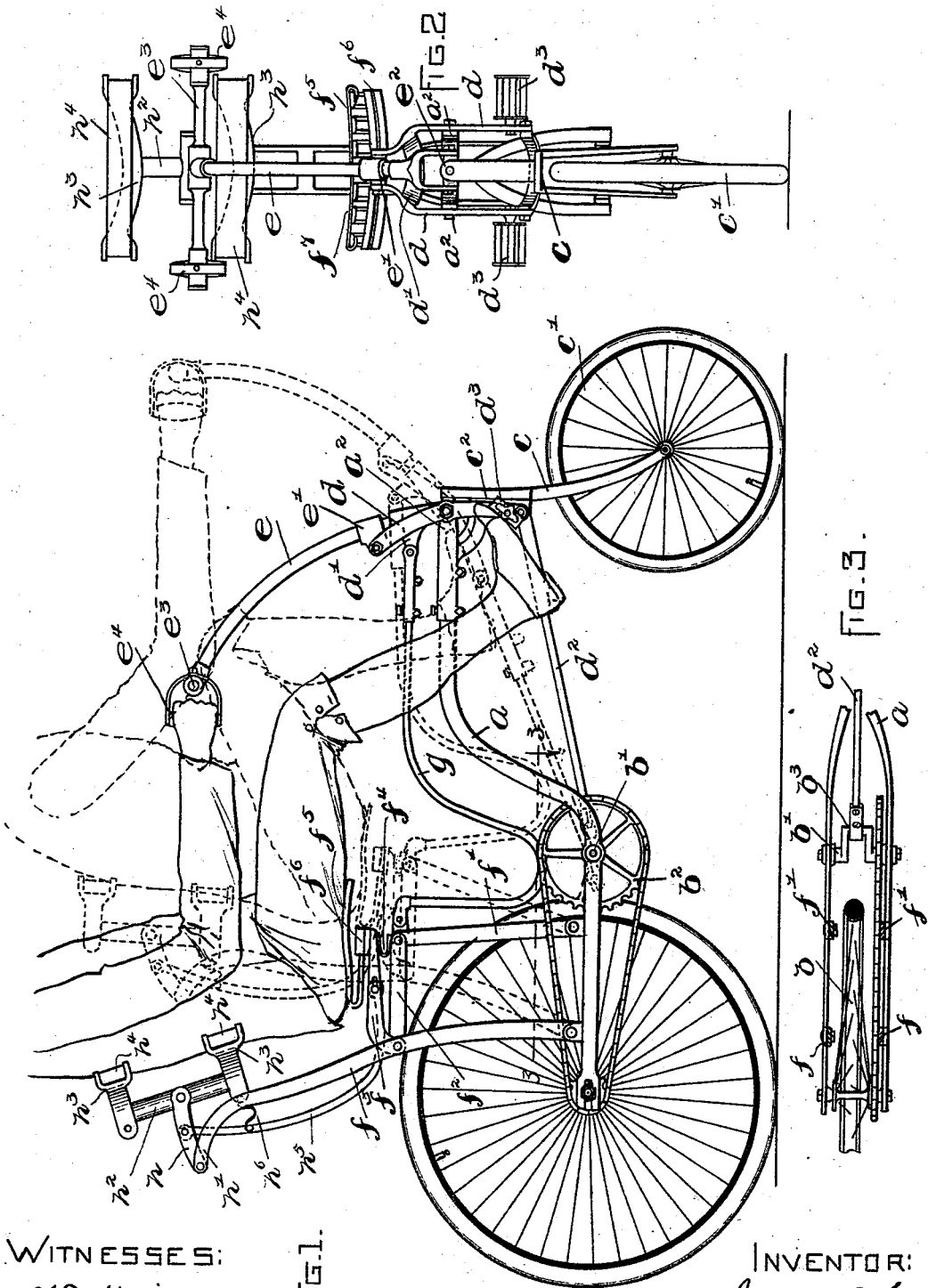
WITNESSES:
INVENTOR:

UNITED STATES PATENT OFFICE.

JUDSON CLARK, OF NEWBURYPORT, MASSACHUSETTS.

VELOCIPEDE.

SPECIFICATION forming part of Letters Patent No. 516,786, dated March 20, 1894.

Application filed November 25, 1893. Serial No. 491,964. (No model.)

*To all whom it may concern:*

Be it known that I, JUDSON CLARK, of Newburyport, in the county of Essex and State of Massachusetts, have invented certain new and useful Improvements in Velocipedes, of which the following is a specification.

This invention relates to an improvement in velocipedes, and may be embodied in a three-wheeled or a two-wheeled vehicle.

The object of the invention is to provide a construction which will bring into action all the muscles of the rider's body, and concentrate them in the propulsion of the machine; and also to so arrange the parts that one set of muscles may be rested while another set performs the work of propelling the machine, and vice versa.

Another object is to provide a construction whereby the machine will accommodate itself to different positions assumed by the rider, so as to insure his comfort.

To the above ends, the invention consists in the novel features of construction and combinations of parts hereinafter described and claimed.

The accompanying drawings illustrate a construction for carrying out the invention.

Figure 1 shows a side elevation of a bicycle embodying the invention. Fig. 2 shows a front elevation. Fig. 3 shows a detail plan view, taken on the line 3—3 of Fig. 1.

The same letters of reference indicate the same parts in all the figures.

In the drawings: the letter $a$ designates the back-bone of the machine, which is preferably made longitudinally extensible, and which affords bearings for the rear wheel $b$, and also for a crank-shaft $b'$, having affixed thereto a sprocket $b^2$, which is geared to the rear wheel in the ordinary way.

$c$ designates a fork, which supports the front wheel $c'$, and which is swiveled to the back-bone $a$ at $c^2$.

The back-bone $a$ has a bifurcated front end $a^2$, to which is pivoted a lever, composed of a pair of arms $d$, rigidly connected together by a cross-piece $d'$. Said lever is pivoted intermediate of its ends, and its lower end is connected by a pitman $d^2$ with the crank $b^3$ of the shaft $b'$, and carries pedals $d^3$. A steering-post $e$ is swiveled in a vertically-extending bearing $e'$ at the upper portion of the lever $d$, and is connected by a universal joint $e^2$ with the front fork $c$, said universal joint being in axial line with the pivoted lever $d$, so as to prevent vibrations of the lever producing friction between the steering-post and its bearing. Said steering-post carries a handle-bar $e^3$ at its upper end, provided with suitably-constructed handles $e^4$, and this post not only constitutes means for steering the machine, but also forms a part of the propelling lever.

The seat of the bicycle is carried on a jointed support, which comprises a back-member $f$, jointed at its lower end to the back-bone $a$ and extending above the seat to form a support for the seat-back; a front-member $f'$, also jointed to the back-bone $a$, and jointed at its upper end, which is directly under the seat, to a link $f^2$, which connects the front and back members $f'$ and $f$ and is jointed to the latter; and an arm $f^3$, pivotally supported on the pin which connects the link $f^2$ and member $f$, and extending upwardly and thence laterally, being yieldingly supported at its forward end by a spring $f^4$ interposed between it and the link $f^2$. The seat is preferably composed of a series of resilient fingers $f^5$, held in a clamp $f^6$ on the arm $f^3$. The fingers $f^5$ are covered by a leather cushion $f^7$, fastened in any suitable way. The seat is connected with the lever $d$ by a rod $g$, jointed at its forward end to the cross-piece $d'$, and at its rear end to the front-member $f'$ of the jointed seat-support. An arm $h$, pivoted to the rearwardly-extending upper portion $h'$ of the back-member $f$ of the seat-support, carries the seat-back, which is composed of a vertical bar $h^2$, pivotally connected at its middle with the arm $h$, and cross-bars $h^3$ clamped to the upper and lower ends of the vertical bar $h^2$ and supporting leather straps $h^4$. The seat-back-supporting arm $h$ is connected with the seat-supporting arm $f^3$ by a bent rod $h^5$, said rod being connected with a laterally-extending portion of the arm $f^3$. The lower end of the seat-back is connected by a link $h^6$ with the rod $h^5$, said link being preferably bent, as shown, to impart to it a resiliency and allow of its expansion and contraction to a limited extent.

The rider, seated on the seat $f^5$, with his back against the strap $h^4$, his feet on the pedals $d^3$ and his hands grasping the handles $e^4$, as indicated in the drawings, by pressing forward on the pedals and at the same time pulling rearwardly on the handle-bar and pressing his back against the straps $h^4$, brings all the muscular energy thus acquired to act on the crank-shaft $b'$, and thereby propel the machine. He then pushes forward on the handle-bar, and gathers himself together for the next stroke. At the same time, the machine may be guided by turning the steering-post $e$, which may be freely operated at any point in the vibrations of the propelling lever, by reason of the connections heretofore described. The connections between the propelling lever and the seat cause the latter to move forward and back with the vibrations of the lever. Vertical movement of the seat-back, to allow for the elongation and contraction of the rider's body and prevent friction between the seat-back and the rider's back, is caused to take place through the connection between the seat-back-supporting arm and the seat-supporting arm.

It will be observed that the weight of the rider's body bears the arm $f^3$ down upon the link $f^2$; and that, as the jointed seat-support advances, the angle between the link $f^2$ and the rear member $f$ of said seat-support increases, and causes an upward movement of the arm $f^3$ on its pivot, and this upward movement is transmitted through the rod $h^5$ to the seat-back-supporting arm $h$. On the rearward movement of the seat-support, the seat-back is correspondingly lowered.

In order that the seat-back may conform at all times to the rider's back, and that the two straps $h^4$ may both be in contact with the rider's back, it is desirable that the upper portion of the seat-back be moved forward to a greater degree than the lower portion. The link $h^6$ reciprocates the lower portion of the seat-back and effects this desirable increase in the advance of the upper portion of the seat-back.

Having thus described my invention, what I claim as new, and desire to secure by Letters Patent, is—

1. A velocipede, comprising in its construction a vertically-disposed propelling lever operatively connected with the driving-shaft, a horizontally-movable seat operatively connected with said lever, and a vertically-movable seat-back operatively connected with the seat, whereby said seat-back is moved up and down by the backward and forward movement of the seat.

2. A velocipede, comprising in its construction a vertically-disposed propelling lever operatively connected with the driving-shaft, a seat on jointed supports and operatively connected with the lever, whereby said seat is vibrated by the lever and a vertically-movable seat-back operatively connected with the seat, whereby said seat-back is moved up and down by the vibrations of the seat.

3. A velocipede, comprising in its construction a vertically-disposed propelling lever operatively connected with the driving-shaft, a jointed seat-support operatively connected with said lever, a seat pivotally connected therewith, a seat-back pivotally supported and capable of vertical movement, and a pitman connecting the seat and back.

4. A velocipede, comprising in its construction a vertically-disposed propelling lever operatively connected with the driving-shaft, a jointed seat-support operatively connected with said lever, a seat pivotally connected therewith, a seat-back swiveled to a pivotal support, a pitman connecting said pivotal support with the seat, and a link connecting the seat-back with said pitman.

5. A velocipede, comprising in its construction a propelling lever pivoted to the frame of the machine, a guiding-post swiveled to said lever, and a universal joint connecting said guiding-post with the front fork of the machine and being in axial line of the pivot of the lever.

In testimony whereof I have signed my name to this specification, in the presence of two subscribing witnesses, this 23d day of November, A. D. 1893.

JUDSON CLARK.

Witnesses:
  DANIEL CAROLAN,
  JOHN COSKERY.